(12) United States Patent
Leizerovich et al.

(10) Patent No.: US 9,734,214 B2
(45) Date of Patent: Aug. 15, 2017

(54) METADATA-BASED TEST DATA GENERATION

(75) Inventors: Maxim Leizerovich, Bat Yam (IL); Ilan Meirman, Petach-Tikva (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 815 days.

(21) Appl. No.: 13/535,913

(22) Filed: Jun. 28, 2012

(65) Prior Publication Data
US 2014/0007056 A1    Jan. 2, 2014

(51) Int. Cl.
*G06F 9/44* (2006.01)
*G06F 9/45* (2006.01)
*G06F 17/30* (2006.01)
*G06F 11/36* (2006.01)

(52) U.S. Cl.
CPC .... *G06F 17/30533* (2013.01); *G06F 11/3684* (2013.01); *G06F 17/30578* (2013.01); *G06F 11/3688* (2013.01); *G06F 17/30303* (2013.01); *G06F 17/30507* (2013.01)

(58) Field of Classification Search
CPC ......... G06F 9/44; G06F 9/4443; G06F 11/36; G06F 11/079; G06F 11/0709; G06F 11/0748; G06F 11/3664; G06F 11/3672; G06F 11/3684; G06F 11/3692; G06F 8/70; G06F 8/36; G06F 8/38; G06F 11/3688; G06F 11/263; G06F 17/243; G06F 17/218; G06F 17/3056; G06F 17/30507; G06F 17/30592; G06F 17/30578; G06F 17/30563; G06F 17/30371; G06F 17/3684; G06F 17/30303; G06F 17/30595; G06F 17/3089
See application file for complete search history.

(56) References Cited

U.S. PATENT DOCUMENTS

| | | | | |
|---|---|---|---|---|
| 5,715,373 | A * | 2/1998 | Desgrousilliers | G06F 11/263 706/11 |
| 5,724,273 | A * | 3/1998 | Desgrousilliers | G06F 11/3692 702/120 |
| 5,812,436 | A * | 9/1998 | Desgrousilliers | G06F 11/3692 702/108 |
| 6,907,546 | B1 * | 6/2005 | Haswell | G06F 11/3684 714/38.11 |
| 7,010,546 | B1 * | 3/2006 | Kolawa | G06F 11/3688 707/694 |
| 7,363,578 | B2 * | 4/2008 | Bendsen | G06F 9/4443 715/236 |
| 7,917,895 | B2 | 3/2011 | Givoni et al. | |

(Continued)

OTHER PUBLICATIONS

Mohammed M. Elsheh et al., Generation and Validation of Web Forms Using Database Metadata and XFORMS, 2010, [Retrieved on Dec. 6, 2013]. Retrieved from the internet: <URL: http://spict.utar.edu.my/SPICT-10CD/papers/spict10_18.pdf> 4 pp. 23-26.*

(Continued)

*Primary Examiner* — Thuy Dao
*Assistant Examiner* — Anibal Rivera
(74) *Attorney, Agent, or Firm* — Mannava & Kang, P.C.

(57) ABSTRACT

Example embodiments disclosed herein relate to a method for generating test data for form validation, where the method includes maintaining metadata for a database, mapping a control field of the form to a column of the database, and generating test data based on the mapping and the metadata.

20 Claims, 8 Drawing Sheets

(56) References Cited

U.S. PATENT DOCUMENTS

| | | | |
|---|---|---|---|
| 9,037,549 B2* | 5/2015 | Sankaranarayanan | G06F 17/30303 707/690 |
| 2002/0101920 A1* | 8/2002 | Choi | H04N 17/004 375/240 |
| 2004/0107183 A1* | 6/2004 | Mangan | G06F 17/3056 |
| 2004/0153968 A1* | 8/2004 | Ching | G06F 17/218 715/235 |
| 2005/0172261 A1* | 8/2005 | Yuknewicz | G06F 8/38 717/106 |
| 2005/0273763 A1* | 12/2005 | Bendsen | G06F 9/4443 717/120 |
| 2006/0026506 A1* | 2/2006 | Kristiansen | G06F 11/3688 715/243 |
| 2008/0147753 A1* | 6/2008 | Chasman | G06F 17/30578 |
| 2008/0270841 A1* | 10/2008 | Quilter | G06F 11/3672 714/38.1 |
| 2009/0063555 A1* | 3/2009 | Fisher | G06F 17/30595 |
| 2009/0083616 A1* | 3/2009 | Ali | G06F 17/243 715/222 |
| 2009/0217250 A1* | 8/2009 | Grechanik | G06F 8/36 717/136 |
| 2009/0217302 A1* | 8/2009 | Grechanik | G06F 8/70 719/320 |
| 2009/0300585 A1 | 12/2009 | Meenakshisundaram et al. | |
| 2011/0022575 A1* | 1/2011 | Tomkins | G06F 17/30371 707/702 |
| 2011/0088014 A1* | 4/2011 | Becker | G06F 11/3684 717/125 |
| 2011/0161375 A1* | 6/2011 | Tedder | G06F 17/3089 707/803 |
| 2011/0231708 A1 | 9/2011 | Lawrance et al. | |
| 2011/0246415 A1* | 10/2011 | Li | G06F 17/30563 707/602 |
| 2012/0290527 A1* | 11/2012 | Yalamanchilli | G06F 17/30592 707/602 |
| 2012/0310905 A1* | 12/2012 | Hans | G06F 17/30507 707/694 |

OTHER PUBLICATIONS

Gurmeet Singh et al., A Metadata Catalog Service for Data Intensive Application, 2003 IEEE, [Retrieved on Mar. 8, 2017]. Retrieved from the internet: <URL: http://ieeexplore.ieee.org/stamp/stamp.jsp?arnumber=1592936> 17 pp. 1-17.*

Phokion G. Kolaitis, Schema Mappings, Data Exchange, and Metadata Management, Jun. 13-15, 2005, [Retrieved on Mar. 8, 2017]. Retrieved from the internet: <URL: http://delivery.acm.org/10.1145/1070000/1065176/p61-kolaitis.pdf> 15 pp. 61-75.*

Anthony J. Lombardo, Functional Test Strategy, Cornell University, edited by Aaron Godert on Jan. 5, 211, Retrieved Internet Jun. 25, 2012,https://confluence.cornell.edu/display/CYNERGY/Functional+Test+Strategy.

* cited by examiner

FIG. 4

(12) United States Patent

METADATA-BASED TEST DATA GENERATION

BACKGROUND

The cost of defects in software applications increases exponentially when such defects are detected and fixed in later stages of the software development lifecycle. The earlier a software defect is detected, the easier and more cost effective it is to fix. Thus, software businesses are challenged to develop robust testing tools and methods to detect software defects early in the development cycle. Developing test cases and datasets for certain applications may be more challenging than others. For example, it may be challenging to generate test cases and data sets for testing an application including multiple forms for data entry (e.g., user interface forms) because of the large number of objects and data formats that are supported by such an application.

BRIEF DESCRIPTION OF THE DRAWINGS

FIG. 4 depicts an example of mapping control fields to a database according to the metadata-based test generation system;

DETAILED DESCRIPTION

INTRODUCTION: Various embodiments described below were developed to leverage database metadata to generate test data for form validation and testing. The generated test data may be used to perform negative testing (i.e., testing the form against illegal or restricted values) and for testing inter-field logic. The described embodiments provide robust test data based on database metadata to increase test coverage and to detect defects early in the development cycle.

An example implementation includes maintaining metadata for a database. The database metadata may include column metadata such as field type, maximum length, mandatory field(s), relationships to other columns, and other column constraints or rules. For example, maintaining the metadata may include extracting and analyzing database metadata. The implementation also includes mapping a control field of a form to a column of the database, and generating test data based on the mapping and the metadata. In one embodiment, negative test data is generated, where the negative test data include extreme data values for negative testing. In another embodiment, test data for inter-field logic validation is generated for validating values in a combo control field and for validating a relation between two or more combo fields. Further, test scripts may be generated based on the test data for injecting test data values during testing.

The following description is broken into sections. The first, labeled "Environment," describes an example of a network environment in which various embodiments may be implemented. The second section, labeled "Components," describes examples of physical and logical components for implementing various embodiments. The third section, labeled "Operation," describes steps taken to implement various embodiments.

Figure 1:
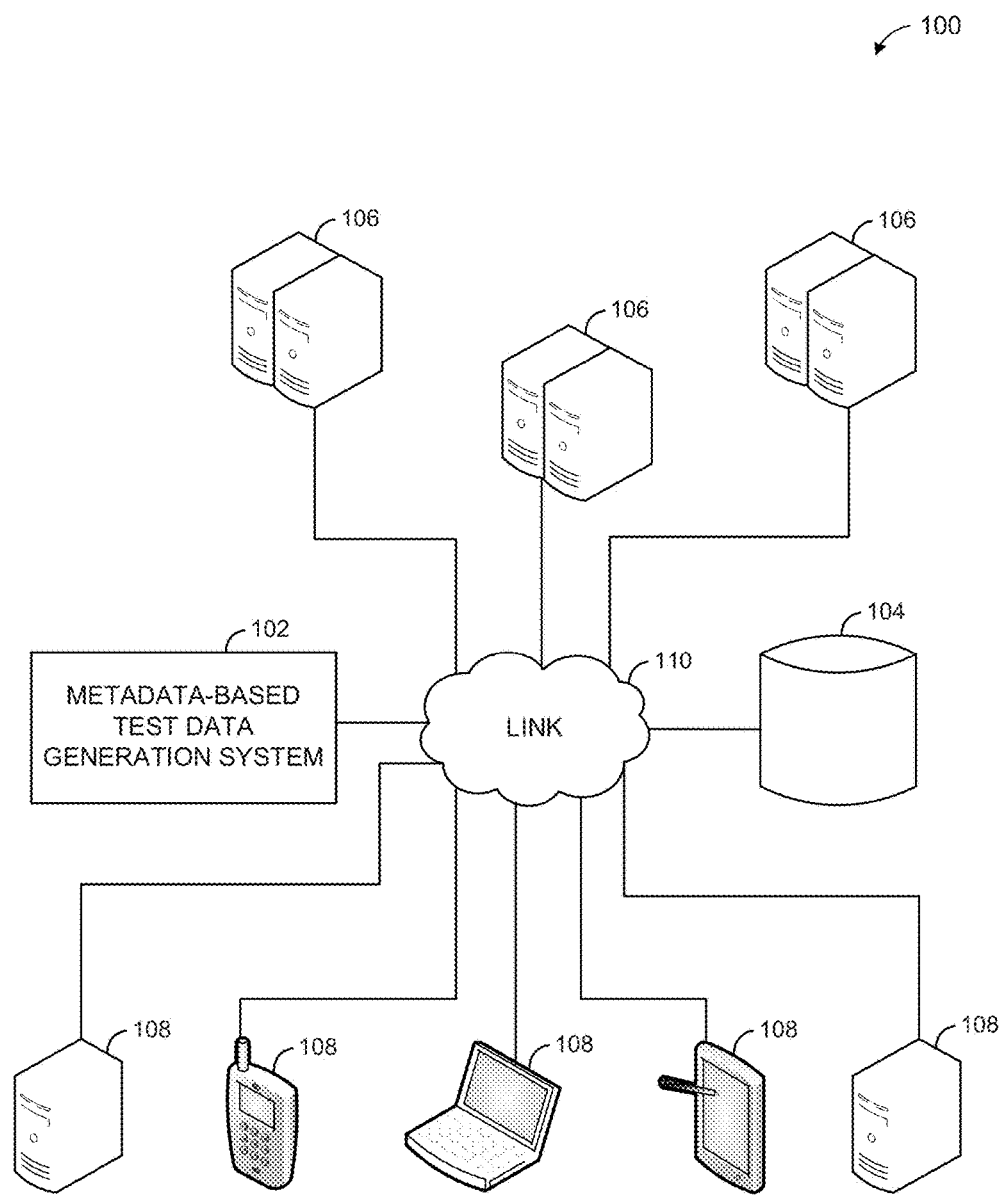
FIG. 1 depicts an environment in which various embodiments may be implemented.

ENVIRONMENT: FIG. 1 depicts an environment 100 in which various embodiments may be implemented. Environment 100 is shown to include metadata-based test data generation system 102, data store 104, server devices 106, and client devices 108. Metadata-based test data generation system 102 described below with respect to FIGS. 2A-2B, 3A-3B, and 4-6, represents generally any combination of hardware and programming configured to generate test data based on database metadata. Data store 104 represents generally any device or combination of devices configured to store data for use by metadata-based test data generation system 102. Such data may include database metadata (e.g., column metadata), generated test data, historical test data, data constraints and rules, database relationship information, test scripts, and business rules.

In the example of FIG. 1, database metadata represents data constraints, data rules, properties and structures of the database extracted from the database, stored in data store 104, or communicated between one or more server devices 106 (e.g., server devices running an application for which test data is to be generated), and one or more client devices 108. Server devices 106 represent generally any computing devices configured to respond to network requests received from client devices 108. A given server device 106 may include a web server, an application server, a file server, or database server. Client devices 108 represent generally any computing devices configured with browsers or other applications to communicate such requests and receive and process the corresponding responses. For example, a user (e.g., a performance tester) may map control fields of the form to columns of the metadata at the client devices 108. Client devices 108 may include a notebook computer, a desktop computer, a laptop computer, a handheld computing device, a mobile phone or smartphone, a slate or tablet computing device, a portable reading device, or any other processing device. Link 110 represents generally one or more of a cable, wireless, fiber optic, or remote connections via a telecommunication link, an infrared link, a radio frequency link, or any other connectors or systems that provide electronic communication. Link 110 may include, at least in part, an intranet, Internet, or a combination of both. Link 110 may also include intermediate proxies, routers, switches, load balancers, and the like.

Figure 2A:
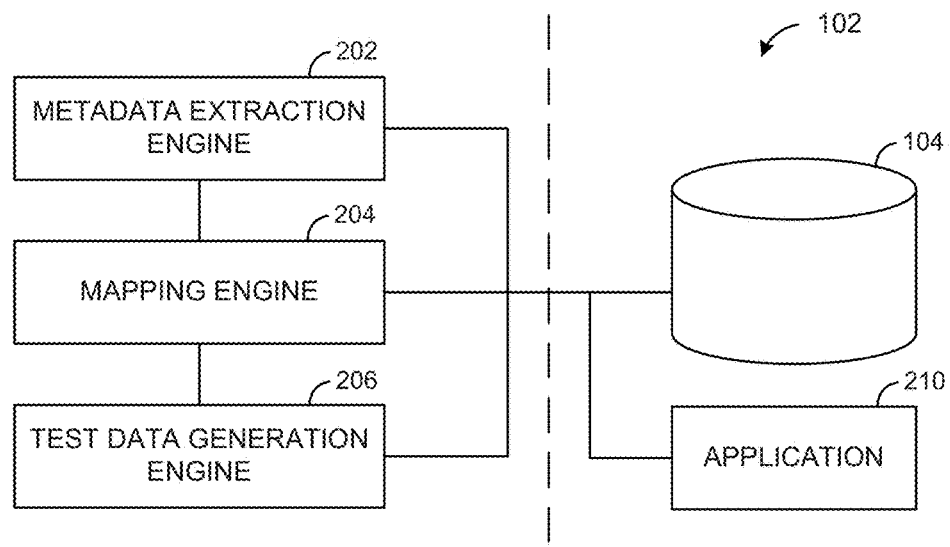
FIGS. 2A and 2B depict a metadata-based test data generation system according to an example.

COMPONENTS: FIGS. 2-6 depict examples of physical and logical components for implementing various embodiments. FIG. 2A depicts metadata-based test data generation system 102 including metadata extraction engine 202, mapping engine 204, and test data generation engine 206. FIG. 2A also depicts engines 202-206 coupled to data store 104 and to application 210 (e.g., an application that implements the form to be tested).

Metadata extraction engine 202 represents generally any combination of hardware and programming configured to extract metadata from a database. For example, metadata extraction engine 202 may be operable to analyze columns of the database, analyze and extract the metadata associated with each column. The column metadata is associated with each form field of the database. Thus, metadata extraction engine 202 may analyze and extract database metadata from application 210 or may retrieve stored database metadata from data store 104. Database metadata includes field type, maximum length, mandatory fields, relationships between columns of the database, other column constraints and rules, and structures and properties describing the database tables and corresponding elements. If the database metadata is extracted from application 210, the extracted metadata information may be stored in data store 104.

Figure 4:
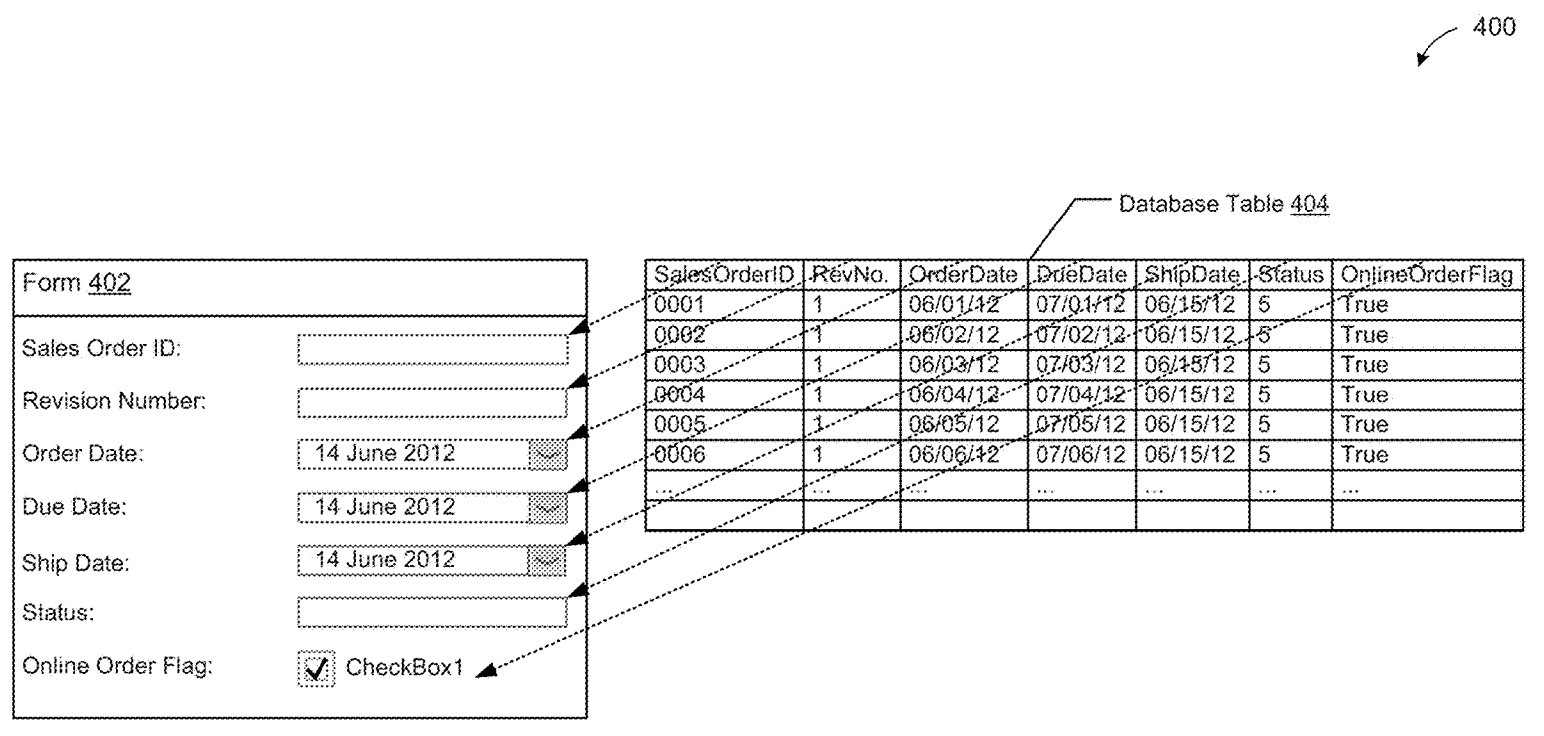

Mapping engine 204 represents generally any combination of hardware and programming configured to map a control field of the form to a column of the database. For example, if the form data is stored in a relational database, input controls of the form are mapped to columns in the database. Mapping of a control to a column means that a particular control field in the form displays data from a particular column (i.e., the mapped column) in the database table. FIG. 4 shows an example of mapping control fields to columns of a database. Referring to FIG. 4, database table 404 includes a plurality of columns—"SalesOrderID," "RevNo.," "OrderDate," "DueDate," "ShipDate," "Status," and "OnlineOrderFlag." Form 402 includes control fields to display data from table 404. As shown in FIG. 4, the control fields of form 402 are mapped to the columns of database table 404. Hence, the database metadata for the columns of the table 404 that have been extracted by metadata extraction engine 202 are also automatically mapped to the control fields of form 402. Mapping of the control fields to the columns may be user configured, performed automatically, or a combination of both.

In one embodiment, mapping engine 204 is operable to receive user configuration inputs for mapping the control fields to the table columns. For example, mapping engine 204 may be configured to generate a graphical user interface (GUI) for receiving mapping configuration from a user. To illustrate, the GUI may generate a visual representation of the table and of the form to enable the user visually columns of the table to form fields. In another embodiment, mapping engine 204 may execute mapping algorithms to automatically map control fields of the form to the database columns. It should be noted that mapping engine 204 may also implement one of the user defined mapping and the algorithm based mapping or a combination of both.

Test data generation engine 206 represents generally any combination of hardware and programming configured to generate test data for testing the form based on the metadata and the mapping. For example, test data generation engine 206 generates the test data for the form based on the extracted or provisioned column metadata and based on the mapping of form control fields to database columns. The generated test data are usable for performing at least one of negative testing of the form and inter-field logic validation of the form.

Because the column metadata describe data types, data constraints, data limits, mandatory fields, and other column properties, and since the columns have been mapped to the input control fields of the form, test data usable for negative testing may be generated, according to one embodiment. Negative test data are usable for testing the form against illegal value entry. For example, the negative test data may by based on column type. To illustrate, if the column is of numeric type, negative test data including non-numeric data, empty string, large value numbers, or negative values may be generated and entered into the form. If the column is of numeric integer type, negative data having decimal data values may be generated and entered. If the column is of data type, negative test data including empty string types, wrong data format, negative or out of range values may be generated and entered. Further, if the column defines string types, negative test data comprising long string values exceeding the string max parameter may be generated and entered. As another example, if the column is defined as being mandatory or required, negative test data including empty or null values may be generated and entered. Thus, negative test data include test data generated that are data values that are contrary, illegal or extreme to the defined values of the column and that are inserted into control fields of the form during testing (i.e., negative testing) to generate an error in the form and ensure that the form does not accept such values during deployment. If such test data are accepted during testing, without an error, then defects in the form (software application) is detected, thereby saving costs associated with fixing such costs.

Figure 5:
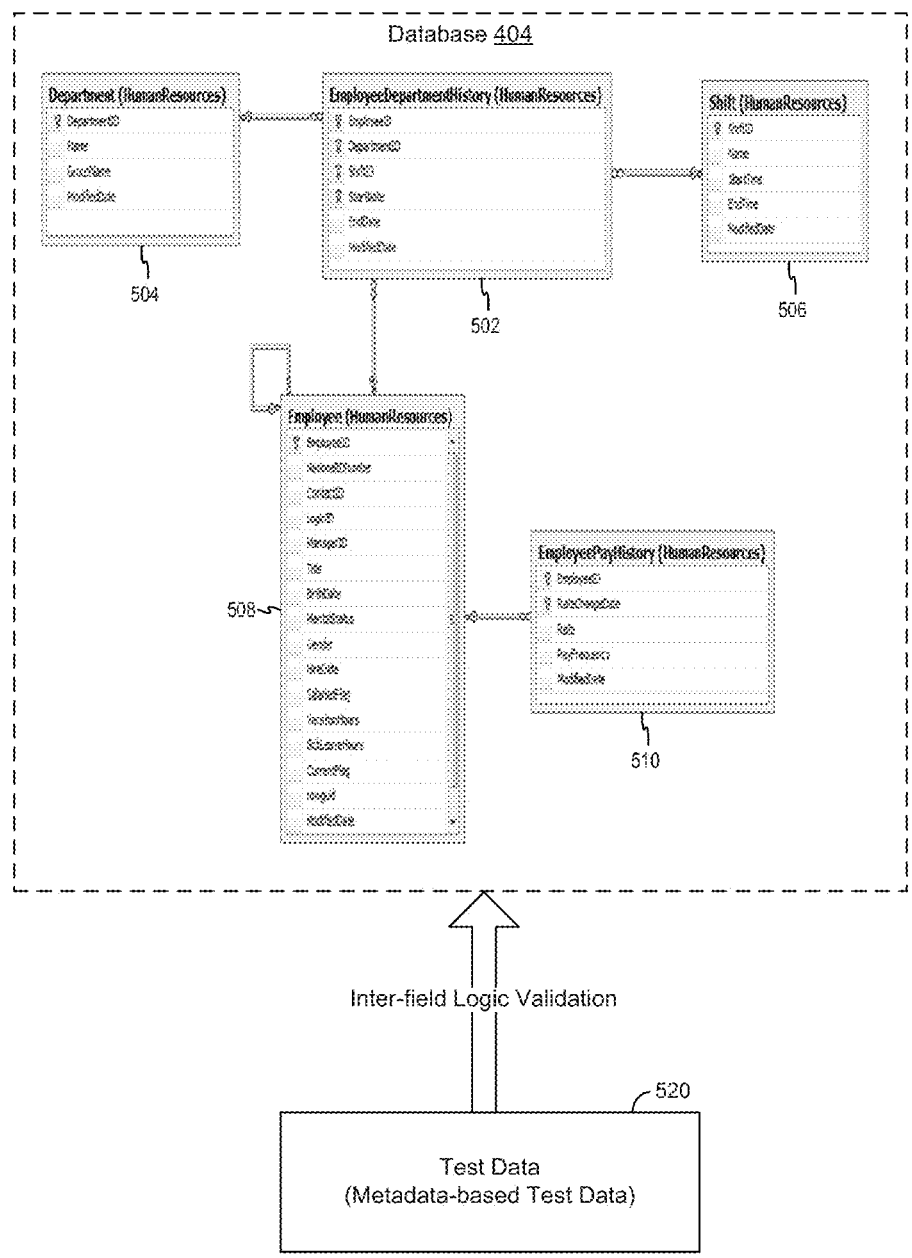
FIG. 5 depicts an example of using metadata-based test data for validating form logic.

In another example embodiment, the generated test data are usable for performing inter-field logic validation of the form. Accordingly, such test data are usable for validating behavior of inter-field logic between controls of the form. In one example, the inter-field logic validation test data may include test data for validating data values in a combo control field based on mapped data columns and lookup tables associated with the combo control field (i.e., one or more other tables with a many to one relation to the column). Referring to FIG. 5 for illustration, a form to be tested/validated may display control fields corresponding to the columns of EmployeeDepartmentHistory table 502. EmployeeDepartmentTable table 502 may include a plurality of columns including ShiftID column mapped to a combo control field ShiftID in the form. As shown in FIG. 5, ShiftID column has a relationship with Shift table 506 (i.e., an associated lookup table). Thus, it is expected that the form should display ShiftID values corresponding to the values of Shift table 506 when executed. Similarly EmployeeDepartmentHistory table 502 is related to Department table 504 and Employee table 508, respectively, corresponding to the DepartmentID and EmployeeID columns, respectively, of the EmployeeDepartmemtHistory table 502. Hence, the combo fields of the form corresponding to the DepartmentID and EmployeeID columns may only be values existing in the Department table 504 and the Employee table 508. Thus, test data 520 is usable for inter-field logic validation and includes values that verify that the form accepts correct values based on the combo relationships of tables in the database (i.e., to verify that available values in the combo fields may only be values existing in the related lookup tables).

Figure 6:
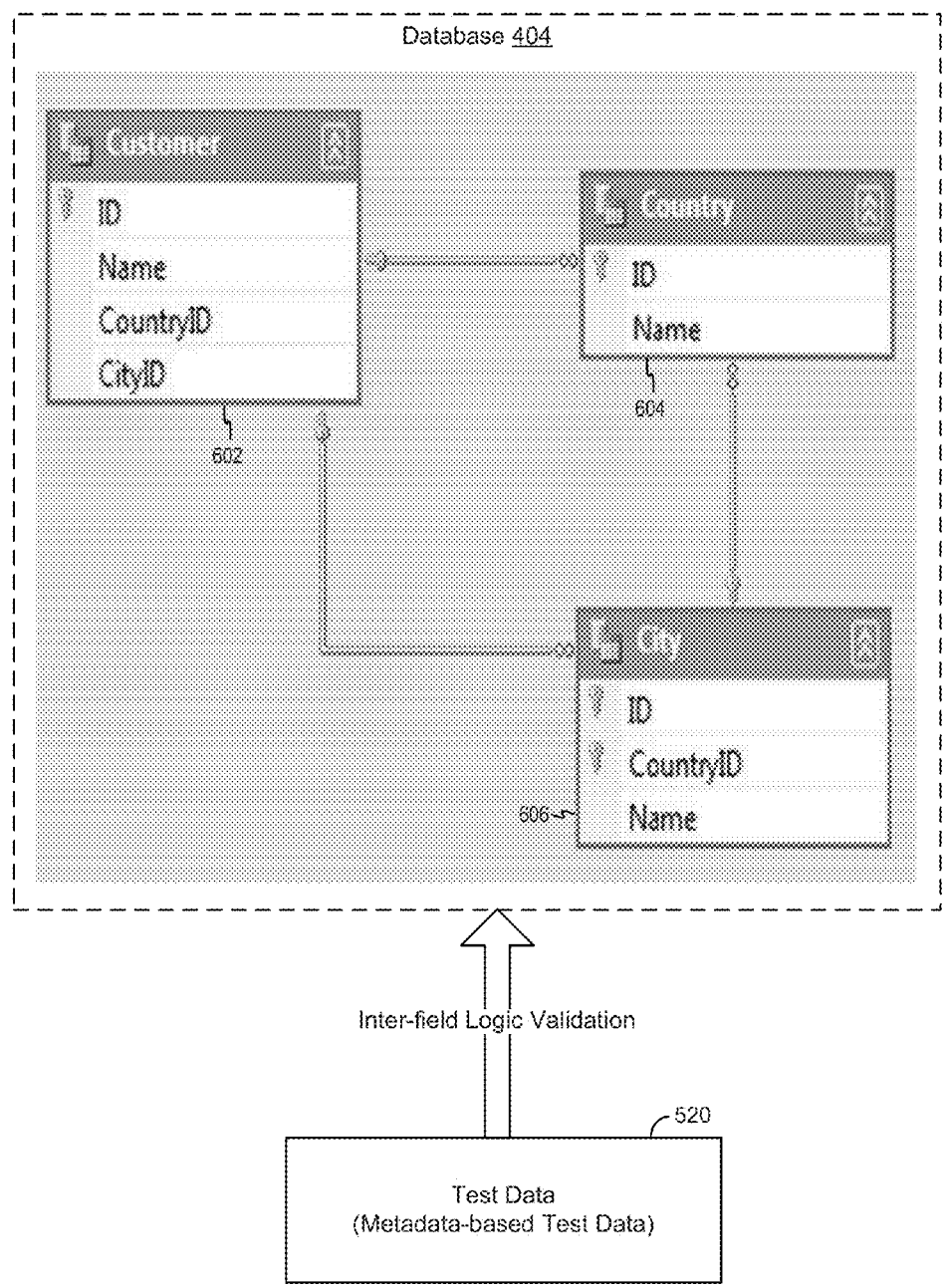
FIG. 6 is depict another example of using metadata-based test data for validating form logic.

In another example, the inter-field logic validation test data may include test data for validating a relationship between two combo fields, based on their relation in the database. Referring to FIG. 6 for illustration, a form to be tested/validated may display control fields corresponding to Customer table 602, Country table 604, and City table 606. Tables 602-606 may be mapped to control fields of the form. For example, control fields of the form may be mapped to ID, Name, CountryID, and CityID of the Customer table 602, where Name has lookup values in Country table and CityID has lookup values in City talk 606. Thus, if a particular country is selected in the form, it is expected that the displayed city values should correspond to cities associated with that country (e.g., correct cities in the United States). Hence, if the country name is changed, the cities displayed should change to correspond with the newly selected country (e.g., changing the country to Mexico should display Mexican cities, not U.S. cities or any other country cities). Accordingly, test data 520 change data values in a parent combo to validate that values in child or children combo fields change based on the table relations (i.e., by changing values in the combo and validating that they have the correct parent record).

Figure 2B:
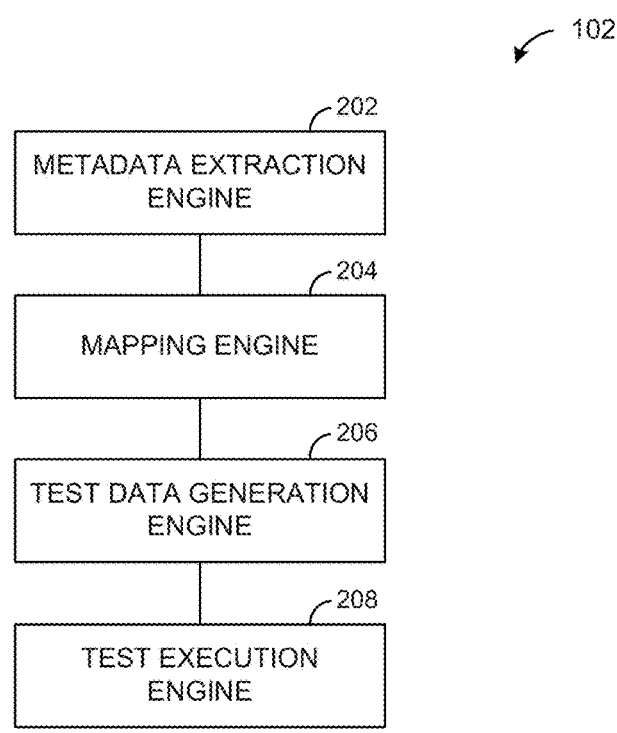

FIG. 2B depicts metadata-based test data generation system 102 including metadata extraction engine 202, mapping engine 204, and test data generation engine 206, as described above. In the example of FIG. 2B metadata-based test data generation system 102 also includes test execution engine 208. Test execution engine 208 represents generally any combination of hardware and programming configured to generate test scripts for injecting the test data during at least one of the negative testing and the inter-field logic testing. Accordingly, test execution engine 208 may be operable to perform the testing and validation of the form based on the test data generated. The test scripts may include structured query language (SQL) script, other test script file types, a spreadsheet file, a standard tester data format (STDF) file, a text file, or any combination thereof.

In foregoing discussion, engines 202-208 of FIGS. 2A-2B were described as combinations of hardware and programming. Such components may be implemented in a number of fashions. Looking at FIGS. 3A-3B, the programming may be processor executable instructions stored on tangible, non-transitory computer-readable storage medium 302 and the hardware may include processor 304 for executing those instructions. Processor 304, for example, can include one or multiple processors. Such multiple processors may be integrated in a single device or distributed across devices. Computer-readable storage medium 302 can be said to store program instructions that when executed by processor 304 implement system 102 of FIGS. 2A-2B. Medium 302 may be integrated in the same device as processor 304 or it may be separate but accessible to that device and processor 304.

In one example, the program instructions can be part of an installation package that when installed can be executed by processor 304 to implement system 102. In this case, medium 302 may be a portable medium such as a CD, DVD, or flash drive or a memory maintained by a server from which the installation package can be downloaded and installed. In another example, the program instructions can be part of an application or applications already installed. Here, medium 302 can include integrated memory such as hard drive, solid state drive, or the like.

Figure 3A:
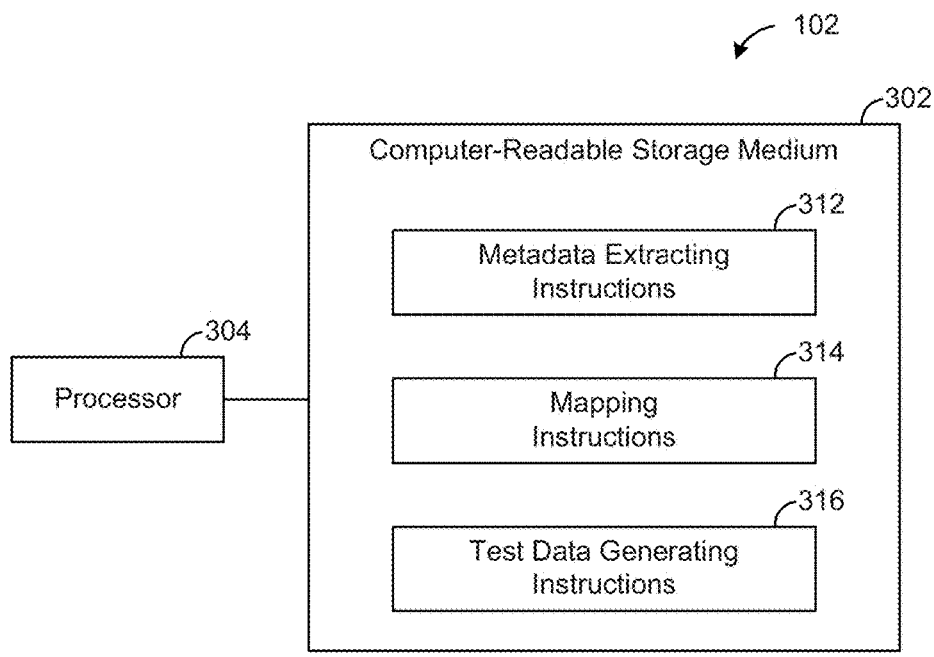
FIGS. 3A-3B depict an example implementation of a processor and a computer-readable storage medium encoded with instructions for implementing a metadata-based test data generating method.

In FIG. 3A, the executable program instructions stored in medium 302 are represented as metadata extracting instructions 312, mapping instructions 314, and test data generating instructions 316 that when executed by processor 304 implement metadata-based test data generation system 102 of FIG. 2A. Metadata extracting instructions 312 represent program instructions that when executed function as metadata extraction engine 202. Mapping instructions 314 represent program instructions that when executed implement mapping engine 204. Test data generating instructions 316 represent program instructions that when executed implement test data generation engine 206.

Figure 3B:
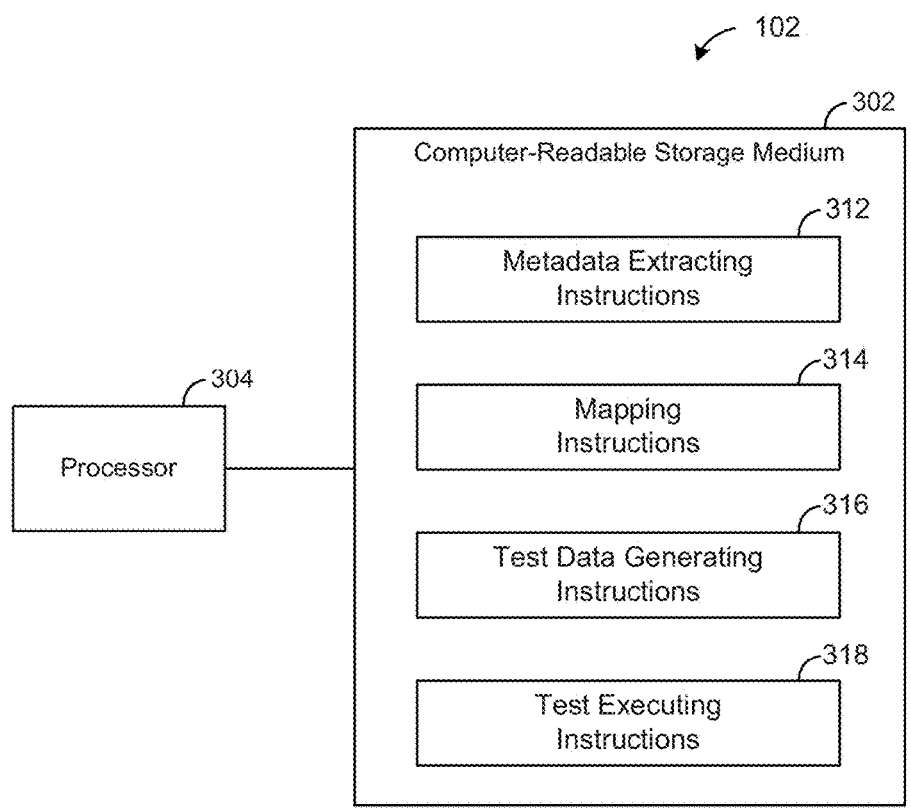

In FIG. 3B, the executable program instructions stored in medium 302 are represented as metadata extracting instructions 312, mapping instructions 314, test data generating instructions 316, and test executing instructions 318. As described above, metadata extracting instruction 312, mapping instructions 314, and test data generating instructions 316 represent program instructions that when executed implement metadata extraction engine 202, mapping engine 204, and test data generation engine 206, respectively. Test executing instructions 318 represent program instructions that when executed implement test execution engine 208.

Figure 7:
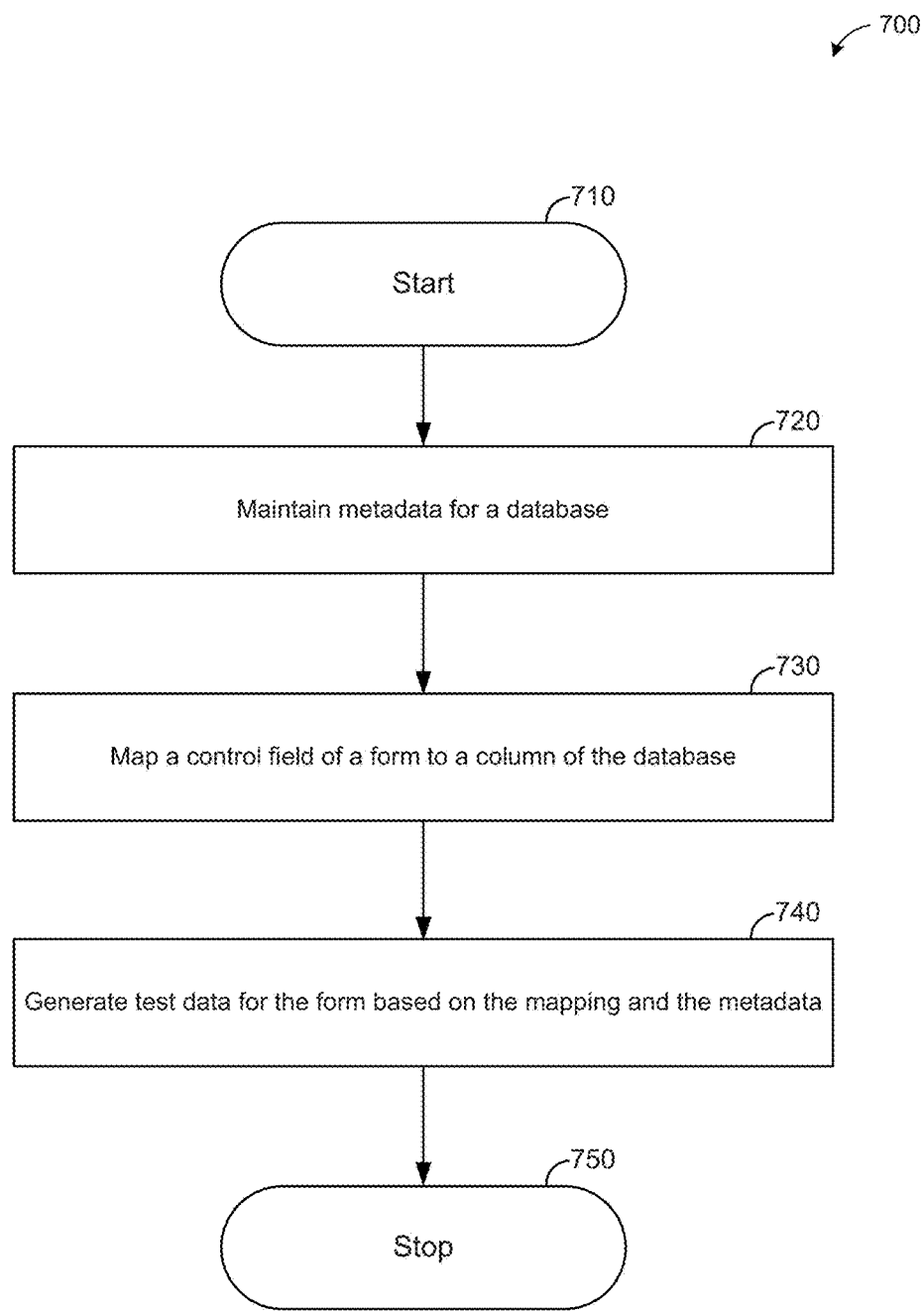
FIG. 7 is a flowchart of an example implementation of a method for generating metadata-based test data.
Figure 8:
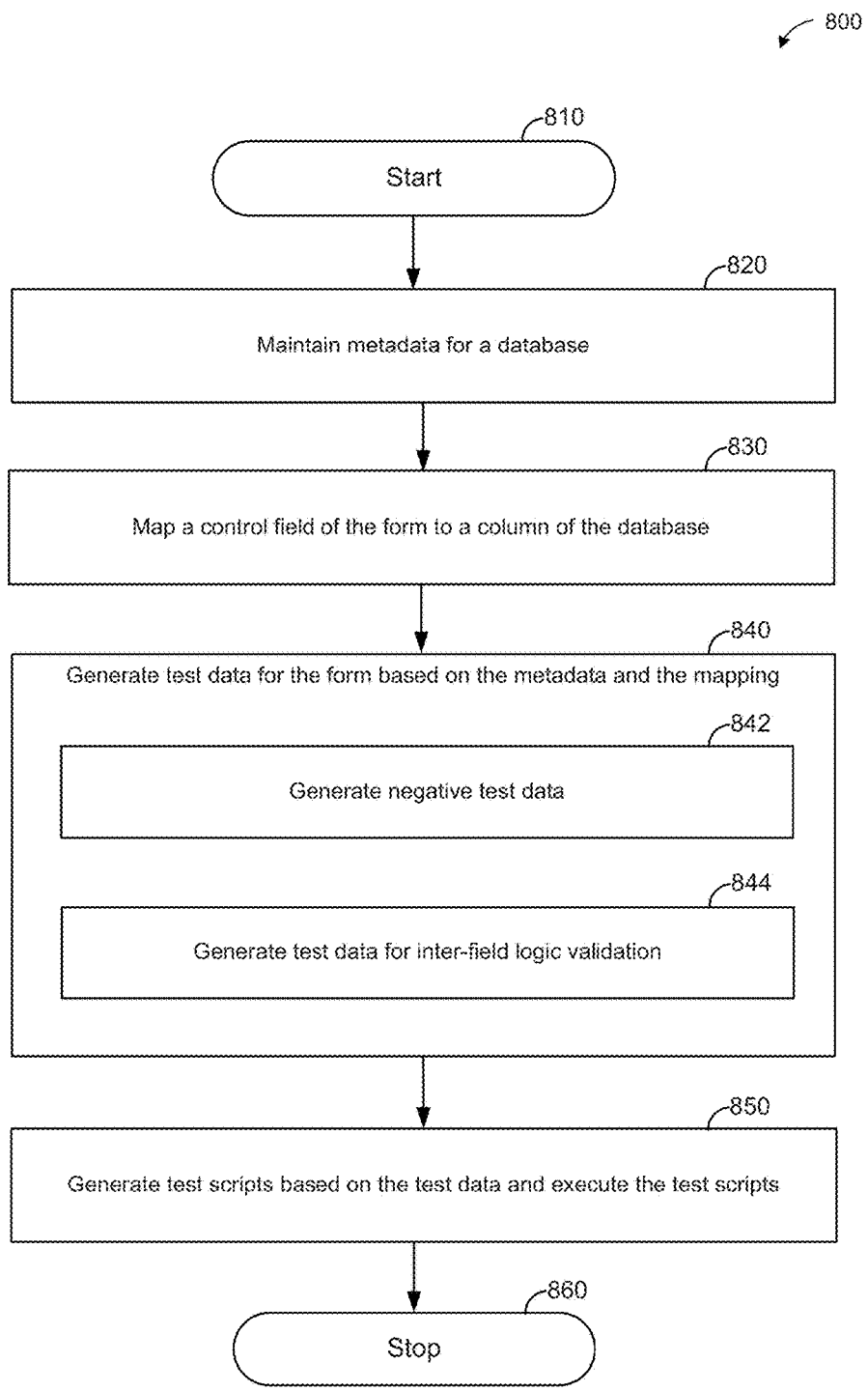
FIG. 8 is a flowchart of another example implementation of a method for generating metadata-based test data.

OPERATION: FIGS. 7 and 8 are example flow diagrams of steps taken to implement embodiments of metadata-based test data generation method. In discussing FIGS. 7 and 8, reference is made to the diagrams of FIGS. 2A-2B to provide contextual examples. Implementation, however, is not limited to those examples.

Starting with FIG. 7, a flowchart of an embodiment of a method 700 for metadata-based test data generation is described. Method 700 may start in step 710 and proceed to step 720, where metadata for a database is maintained. Referring to FIGS. 2A and 2B, metadata extraction engine 202 may extract metadata database from application 210. For example, metadata extraction engine may extract and analyze column metadata from tables of database in application 210. The extracted metadata may be stored in data store 104. Alternately, or in addition, the metadata may be retrieved from data store 104. The metadata may include, for example, data type, size, number of columns, length, and column relationships.

Method 700 also includes step 730, where a control field of a form is mapped to a column of the database. Referring to FIGS. 2A and 2B, mapping engine 204 may be responsible for implementing step 730. For example, mapping engine 204 may enable a user to map a control field of the form to a column of the database, as shown and described in FIG. 4. Alternately, or in addition, mapping engine 204 may be configured to automatically map the control field of the form to the column of the database via mapping algorithms.

Method 700 may proceed to step 740, where test data for the form is generated based on the mapping and the metadata. Referring to FIGS. 2A and 2B, test data generation engine 206 may be responsible for implementing step 740. For example, the generated test data may be usable for performing at least one of negative testing of the form and inter-field logic validation of the form. Method 700 may then proceed to step 750, where the method stops.

FIG. 8 depicts a flowchart of an embodiment of a method 800 for metadata-based test data generation. Method 800 may start in step 810 and proceed to step 820, where metadata for a database is maintained. Referring to FIGS. 2A and 2B, metadata extraction engine 202 may be responsible for implementing step 820. Method 800 may proceed to step 830, where a control field of the form is mapped to a column of the database. Referring to FIGS. 2A and 2B, mapping engine 204 may be responsible for implementing step 830. Method 800 may proceed to step 840, where test data for the form is generated based on the metadata and the mapping. Step 840 may further include step 842, where negative test data is generated, and step 844, where test data for inter-field logic validation is generated. Referring to FIGS. 2A and 2B, test data generation engine 206 may be responsible for implementing steps 840-844. Method 800 may proceed to step 850, where test scripts are generated based on the test data and where the test scripts are executed. Referring to FIG. 2B, test execution engine 208 may be responsible for implementing step 850. For example, test execution engine 208 may generate test scripts such as SQL scripts from the test data. The test scripts may be usable, when executed by test execution engine 208, to inject data values into the form during testing of the form. Method 800 may then proceed to step 860, where the method 800 stops.

CONCLUSION: FIGS. 1-6 depict the architecture, functionality and operation of various embodiments. In particular, FIGS. 2A-2B and 3A-3B depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instructions execution system. A computer-readable medium can comprise any one or more of many physical, non-transitory media such as, for example, electronic, magnetic, optical, electromagnetic, or semiconductor device. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagrams of FIGS. 7-8 show specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method comprising:
   extracting column metadata from a relational database, the column metadata describing a plurality of columns of a data table included in the relational database, the data table comprising a plurality of data records, wherein the column metadata comprises at least one of field data types, mandatory fields, or relationships to other columns;
   generating a graphical mapping interface comprising an interface form and the plurality of columns of the data table, the interface form comprising a plurality of input controls;
   receiving, in the graphical mapping interface, user inputs defining a plurality of control-column mappings between the plurality of input controls of the interface form and the plurality of columns of the data table;
   in response to a receipt of the user inputs defining the plurality of control-column mappings:
      automatically generating, using the plurality of control-column mappings, a plurality of control-metadata mappings between the plurality of input controls to the column metadata; and
      using the plurality of control-metadata mappings, automatically generating, by a processor, new test data values for testing the plurality of input controls, the new test data values comprising data values that are illegal according to the column metadata.

2. The method of claim 1, wherein the column metadata describes data types of the plurality of columns in the data table.

3. The method of claim 1, wherein the column metadata describes data limits of the plurality of columns in the data table.

4. The method of claim 1, the new test data further comprising test data for inter-field logic validation.

5. The method of claim 4, wherein the inter-field logic validation test data comprises test data values for validating relationships between multiple combo fields of the interface form.

6. The method of claim 1, wherein the new test data values further include extreme values that are legal according to the column metadata.

7. The method of claim 1, further comprising:
   generating test scripts to inject the new test data values; and
   executing the test scripts to validate the interface form.

8. A system comprising:
   a hardware processor;
   a machine-readable storage medium storing instructions executed by the hardware processor to:
      extract column metadata from a relational database, the column metadata describing a plurality of columns of a data table included in the relational database, the data table comprising a plurality of data records, wherein the column metadata comprises at least one of field data types, mandatory fields, or relationships to other columns;
      generate a graphical mapping interface comprising an interface form and the plurality of columns of the data table, the interface form comprising a plurality of input controls;
      receive, from the graphical mapping interface, user inputs defining a plurality of control-column mappings between the plurality of input controls of the interface form and the plurality of columns of the data table;
      in response to a receipt of the user inputs defining the plurality of control-column mappings:
         automatically generate, using the plurality of control-column mappings, a plurality of control-metadata mappings between the plurality of input controls to the column metadata; and
         automatically generate, using the plurality of control-metadata mappings, new test data values for testing the plurality of input controls, the new test data values including data values that are illegal according to the column metadata.

9. The system of claim 8, wherein the new test data values further include data values for validating relationships between multiple combo fields of the interface form.

10. The system of claim 8, further comprising instructions executed by the hardware processor to automatically generate test scripts for injecting the new test data values during testing.

11. The system of claim 8, wherein the column metadata describes data types of the plurality of columns in the data table.

12. The system of claim 8, wherein the column metadata describes data limits of the plurality of columns in the data table.

13. A non-transitory computer readable medium comprising instructions that when executed implement a method, the method comprising:
- extracting column metadata from a relational database, the column metadata describing a plurality of columns of a data table included in the relational database, the data table comprising a plurality of data records, wherein the column metadata comprises at least one of field data types, mandatory fields, or relationships to other columns;
- generating a graphical mapping interface comprising an interface form and the plurality of columns of the data table, the interface form comprising a plurality of input controls;
- receiving, in the graphical mapping interface, user inputs defining a plurality of control-column mappings between the plurality of input controls of the interface form and the plurality of columns of the data table;
- in response to a receipt of the user inputs defining the plurality of control-column mappings:
  - automatically generating, using the plurality of control-column mappings, a plurality of control-metadata mappings between the plurality of input controls to the column metadata; and
  - automatically generating, using the plurality of control-metadata mappings, new test data values for testing the plurality of input controls, the new test data values comprising data values that are illegal according to the column metadata.

14. The non-transitory computer readable medium of claim 13, wherein the column metadata describes data types of the plurality of columns in the data table.

15. The non-transitory computer readable medium of claim 13, wherein the column metadata describes data limits of the plurality of columns in the data table.

16. The non-transitory computer readable medium of claim 13, wherein the column metadata describes relationships between different columns of the data table.

17. The non-transitory computer readable medium of claim 13, the method further comprising:
- generating test scripts to inject the new test data values during testing; and
- executing the test scripts to validate the interface form.

18. The non-transitory computer readable medium of claim 13, wherein the new test data values further include data values for validating a combo control field based on mapped data column and lookup tables associated with the combo control field.

19. The non-transitory computer readable medium of claim 13, wherein the new test data values further include data values for validating a relation between multiple combo fields based on their relation in the database.

20. The non-transitory computer readable medium of claim 13, wherein the new test data values further include extreme values that are legal according to the column metadata.

* * * * *